United States Patent
Crean

(10) Patent No.: US 6,776,451 B2
(45) Date of Patent: Aug. 17, 2004

(54) MOTORHOME HVAC SYSTEM

(75) Inventor: Johnnie R. Crean, Chino, CA (US)

(73) Assignee: Alfa Leisure, Inc., Ontario, CA (US)

( * ) Notice: Subject to any disclaimer, the term of this patent is extended or adjusted under 35 U.S.C. 154(b) by 0 days.

(21) Appl. No.: 09/971,779

(22) Filed: Oct. 4, 2001

(65) Prior Publication Data

US 2002/0113461 A1 Aug. 22, 2002

Related U.S. Application Data

(63) Continuation-in-part of application No. 09/728,946, filed on Dec. 1, 2000.
(60) Provisional application No. 60/318,136, filed on Sep. 7, 2001.

(51) Int. Cl.⁷ .............................................. B60H 1/00
(52) U.S. Cl. ........................................ 296/156; 454/83
(58) Field of Search .................... 276/156; 454/83, 454/99, 103, 104, 105, 108, 111, 137, 139, 141, 142, 143, 144, 156, 158, 159, 160, 245, 246, 247; 296/208, 190.09, 164

(56) References Cited

U.S. PATENT DOCUMENTS

| | | | | |
|---|---|---|---|---|
| 986,731 A | * | 3/1911 | McGerry | 454/105 |
| 1,536,518 A | | 5/1925 | Osborn | |
| 2,000,477 A | * | 5/1935 | Carry | 454/112 |
| 2,089,799 A | * | 8/1937 | Hulse | 454/112 |
| 2,150,615 A | | 3/1939 | Sword | |
| 2,177,394 A | | 10/1939 | Pierce | |
| 2,225,319 A | | 12/1940 | Rollo | |
| 2,268,502 A | * | 12/1941 | Browne | 454/105 |
| 2,271,158 A | * | 1/1942 | Browne | 454/105 |
| 2,463,255 A | * | 3/1949 | Elliott | 454/83 |
| 2,606,057 A | | 8/1952 | Johnson | |
| 2,639,187 A | | 5/1953 | Grumbache | |
| 2,704,223 A | | 3/1955 | Houdart | |

(List continued on next page.)

FOREIGN PATENT DOCUMENTS

| | | | |
|---|---|---|---|
| CA | 2036838 | | 3/1992 |
| CH | 353262 | | 9/1957 |
| DE | 42 04 640 A | | 8/1993 |
| EP | 0239548 | * | 9/1987 |
| GB | 616274 | | 1/1949 |
| GB | 2088789 | | 11/1980 |
| GB | 2 260 951 | | 5/1993 |
| IT | 478931 | | 5/1951 |
| WO | WO 008802705 A1 | * | 4/1988 ................ 296/24.1 |

OTHER PUBLICATIONS

Brochure: Alfa™ Gives you More!; Gold/Ideal, 1999; 11/98.
Carefre, the World's Greatest Selection of RV Awnings, Sidewinder II, vol. 8, Issue 1, p. 19, 1997.
Brochure: Ideal from Alfa, 11/96.

*Primary Examiner*—D. Glenn Dayoan
*Assistant Examiner*—H. Gutman
(74) *Attorney, Agent, or Firm*—Knobbe, Martens, Olson & Bear, LLP

(57) ABSTRACT

A unitized heating, ventilation, and air conditioning (HVAC) system ventilates and regulates the air temperature inside a motorhome. Air is drawn from inside the motorhome and is directed to a furnace and an air conditioning unit via a common air return. A filter is positioned within the common return. The HVAC unit is compact and adapted for placement below the living area of motorhome so as to reduce the noise inside the cabin generated by the HVAC system and to reduce the center of gravity of the motorhome.

12 Claims, 3 Drawing Sheets

U.S. PATENT DOCUMENTS

| | | | |
|---|---|---|---|
| 2,788,791 A | 4/1957 | Pospisil et al. | |
| 2,876,035 A | 3/1959 | Houdart | |
| 3,106,750 A | 10/1963 | Jarman | |
| 3,165,350 A | 1/1965 | Willson | |
| 3,237,545 A | * 3/1966 | Gillick et al. | 454/83 |
| 3,254,914 A | 6/1966 | Steck | |
| 3,287,058 A | 11/1966 | Wells | |
| 3,300,839 A | 1/1967 | Lichti | |
| 3,308,738 A | * 3/1967 | Heimann | 454/105 |
| 3,341,986 A | 9/1967 | Brosig | |
| 3,343,473 A | * 9/1967 | Gillick et al. | 454/99 |
| 3,565,480 A | 2/1971 | McCollum et al. | |
| 3,566,614 A | 3/1971 | Imral | |
| 3,572,809 A | 3/1971 | Buland | |
| 3,608,954 A | 9/1971 | Lynd | |
| 3,719,386 A | 3/1973 | Puckett et al. | |
| 3,735,998 A | 5/1973 | Green | |
| 3,740,088 A | 6/1973 | Ratcliff | |
| 3,801,138 A | 4/1974 | Quick | |
| 3,825,281 A | 7/1974 | Howard | |
| 3,850,470 A | 11/1974 | Trelle | |
| 3,887,220 A | 6/1975 | Hall | |
| 3,895,726 A | 7/1975 | Rassieur | |
| 3,902,752 A | 9/1975 | Pelletier | |
| 3,915,492 A | 10/1975 | Agnese | |
| 3,918,510 A | 11/1975 | Hayward | |
| 3,959,985 A | 6/1976 | Schulze, Sr. | |
| 3,962,885 A | 6/1976 | Schoenbachler et al. | |
| 4,014,586 A | 3/1977 | Swofford | |
| 4,106,732 A | 8/1978 | Whiting | |
| 4,108,326 A | 8/1978 | Bertolini | |
| 4,109,954 A | 8/1978 | Wall | |
| 4,147,379 A | 4/1979 | Winslow | |
| 4,175,576 A | 11/1979 | Iby | |
| 4,322,108 A | 3/1982 | McPherson | |
| 4,457,554 A | 7/1984 | Fuisz et al. | |
| 4,468,823 A | 9/1984 | Tounjian | |
| 4,480,866 A | 11/1984 | Komatsu | |
| 4,500,132 A | 2/1985 | Yoder | |
| 4,531,453 A | * 7/1985 | Warman et al. | 454/139 |
| 4,550,946 A | 11/1985 | Hanemaayer | |
| 4,589,463 A | 5/1986 | Ryan | |
| RE32,262 E | 10/1986 | Stewart | |
| 4,652,041 A | 3/1987 | Barber et al. | |
| 4,653,125 A | 3/1987 | Porter | |
| 4,719,954 A | 1/1988 | Curtis et al. | |
| 4,724,748 A | * 2/1988 | Geyer | 454/137 |
| 4,728,144 A | 3/1988 | Crean | |
| 4,729,594 A | 3/1988 | Hoff | |
| 4,746,164 A | 5/1988 | Crean | |
| 4,772,063 A | 9/1988 | Amy | |
| 4,776,631 A | 10/1988 | Sargent et al. | |
| 4,841,897 A | 6/1989 | Claflin | |
| 4,867,502 A | 9/1989 | Sylvester et al. | |
| 4,935,599 A | * 6/1990 | Babin et al. | 454/100 |
| 4,953,449 A | * 9/1990 | Jackson | 454/156 |
| 4,955,661 A | 9/1990 | Mattice | |
| 4,957,323 A | 9/1990 | Johnson | |
| 4,960,299 A | 10/1990 | Steadman | |
| 4,971,355 A | 11/1990 | Studdard | |
| 4,974,899 A | 12/1990 | Sargent | |
| 5,028,072 A | 7/1991 | Lindsay | |
| 5,061,001 A | 10/1991 | Madden et al. | |
| 5,090,749 A | 2/1992 | Lee | |
| 5,100,196 A | 3/1992 | Dodgen | |
| 5,100,716 A | 3/1992 | Juneau | |
| 5,112,082 A | 5/1992 | Clelland | |
| 5,143,418 A | 9/1992 | Fouquet | |
| 5,171,056 A | 12/1992 | Faludy et al. | |
| 5,184,976 A | * 2/1993 | Babin | 454/108 |
| 5,199,120 A | 4/1993 | Holmes | |
| 5,237,782 A | 8/1993 | Cooper | |
| 5,242,185 A | 9/1993 | Carr et al. | |
| 5,248,005 A | 9/1993 | Mochizuki | |
| 5,263,894 A | * 11/1993 | Hirakawa et al. | 454/105 |
| 5,280,990 A | 1/1994 | Rinard | |
| 5,291,701 A | 3/1994 | Delacollette et al. | |
| 5,307,645 A | * 5/1994 | Pannell | 454/144 |
| 5,358,298 A | 10/1994 | Fate | |
| 5,374,094 A | 12/1994 | Smith et al. | |
| 5,389,035 A | * 2/1995 | Ishida et al. | 454/99 |
| 5,401,050 A | 3/1995 | Baker | |
| 5,403,063 A | 4/1995 | Sjostedt et al. | |
| 5,419,607 A | 5/1995 | Oliveira | |
| 5,439,415 A | * 8/1995 | Hirikawa et al. | 545/99 |
| 5,516,182 A | 5/1996 | Aragon et al. | |
| 5,529,825 A | 6/1996 | Sutherland | |
| 5,560,444 A | 10/1996 | Tiedge | |
| 5,566,918 A | 10/1996 | Becker | |
| 5,575,453 A | * 11/1996 | Dion | 454/108 |
| 5,634,683 A | 6/1997 | Young | |
| 5,658,031 A | 8/1997 | DiBiagio et al. | |
| 5,658,032 A | 8/1997 | Gardner | |
| 5,673,962 A | 10/1997 | Maieli et al. | |
| 5,706,616 A | 1/1998 | Fernandez | |
| 5,718,253 A | 2/1998 | McNamee | |
| 5,734,336 A | 3/1998 | Smithline | |
| 5,746,473 A | 5/1998 | Crean | |
| 5,785,373 A | 7/1998 | Futrell et al. | |
| 5,788,306 A | 8/1998 | DiBiagio et al. | |
| 5,791,715 A | 8/1998 | Nebel | |
| 5,791,726 A | 8/1998 | Kaufman | |
| 5,800,002 A | 9/1998 | Tiedge et al. | |
| 5,820,224 A | 10/1998 | Dimatteo et al. | |
| 5,833,294 A | 11/1998 | Williams et al. | |
| 5,894,698 A | 4/1999 | Dewald, Jr. et al. | |
| 5,902,001 A | 5/1999 | Schneider | |
| 5,915,774 A | 6/1999 | Tiedge | |
| 5,934,026 A | 8/1999 | Green | |
| 5,940,012 A | 8/1999 | Studebaker | |
| 5,951,082 A | 9/1999 | DiBiagio et al. | |
| 5,983,576 A | 11/1999 | Hanser et al. | |
| 6,007,142 A | 12/1999 | Gehman et al. | |
| 6,098,346 A | 8/2000 | Miller et al. | |
| 6,158,794 A | 12/2000 | Flanagan | |
| 6,170,903 B1 | 1/2001 | Crean | |
| 6,231,115 B1 | 5/2001 | Crean | |
| 6,260,909 B1 | 7/2001 | Crean et al. | |
| RE37,351 E | 9/2001 | Crean | |
| 6,293,612 B1 | 9/2001 | Crean | |
| 6,315,354 B1 | * 11/2001 | Tani et al. | 454/137 |
| 6,416,116 B1 | * 7/2002 | Stanton et al. | 454/108 |
| 6,508,076 B1 | * 1/2003 | Gast et al. | 454/137 |
| 2001/0029162 A1 | * 10/2001 | Yoshinori et al. | 454/137 |

* cited by examiner

MOTORHOME HVAC SYSTEM

RELATED APPLICATIONS

This application is a continuation-in-part of U.S. application Ser. No. 09/728,946 entitled "Motorhome With Increased Interior Height" filed Dec. 1, 2000 and claims the benefit of U.S. Provisional Application No. 60/318,136 filed Sep. 7, 2001 entitled "Motorhome HVAC System".

BACKGROUND OF THE INVENTION

1. Field of the Invention

The invention relates to the field of vehicle heating, venting, and air conditioning (HVAC) systems and, in particular, to an HVAC system adapted for motorhomes in which the HVAC system is substantially positioned outside the living portion of the motorhome and employs a common air return system.

2. Description of the Related Art

Motorhomes have become an increasingly popular and common means of recreation. Motorhomes are self-propelled vehicles that include a living space inside. Motorhomes typically provide sleeping areas, cooking facilities, and self-contained water supplies and toilet facilities. More elaborate motorhomes can include refrigerator/freezer units, showers and/or bathtubs, air conditioning, heaters, built in generators and/or power inverters, televisions, VCRs, and clothes washers and dryers. Motorhomes provide many of the amenities of a residential home while on the road away from home and are popular for this reason. Motorhome users will typically use the motorhome to travel to a recreational area and live in the motorhome for some period of time. It is not unusual for people, particularly retired persons, to use a motorhome as their primary residence. Motorhome users often have families with children and, as their trips are often of a recreational nature, will often invite friends or family along on the trip.

It can be understood that since a motorhome will often be used by a large number of people and often for an extended period of time, the motorhome manufacturers and customers will seek as many amenities and as much interior living space as possible. A major goal of motorhome manufacturers and their customers is to maximize the amount of usable living space inside their motorhomes. However, the overall size of an motorhome is limited both by vehicle code regulations and by practical limitations on what is reasonable to drive and maneuver. Vehicle codes restrict the maximum height, width, and length of vehicles that may be driven on public roads. Also, as a vehicle increases in size, it becomes increasingly difficult to drive and can become physically too large to pass through locations that the driver may wish to go. In addition, as the motorhome gets physically larger, more fuel is required to move it, which increases the cost of operation.

An additional design constraint on the construction and design of motorhomes is their overall weight. Since an motorhome is intended to be mobile, an integral power plant is provided and the engine and drive-train have an upper design limit on the weight each is capable of moving. In addition, the chassis, suspension, wheels, and brakes of a motorhome also have upper design limits as to how much weight they can safely accommodate. These weight limits are established after careful engineering analysis and the weight ratings are endorsed and enforced by responsible governmental agencies. Exceeding the established weight limits of a power-train or chassis component can lead to excessive wear and failure, unacceptable performance, and exposure to liability in case of an accident. It is also highly desirable that as much payload as possible is available to accommodate passengers and cargo, i.e. available weight load between the wet weight of the motorhome and the total maximum gross weight of the motorhome.

A particular issue with the weight of a motorhome is its distribution along a vertical axis. The distance of a vehicle's center of mass from the road surface has a dramatic effect on the handling characteristics of the vehicle. The closer the center of mass is to the road surface, the shorter the moment arm between the center of mass and the roll axis of the vehicle. The shorter the moment arm between the center of mass and the roll axis of the vehicle, the less tendency the vehicle will have to lean in turns. Leaning in turns is uncomfortable for the occupants and typically places uneven loads on the tires and suspensions, compromising turning ability. Motorhomes, typically being quite tall, often exhibit significant leaning in turns. To minimize this leaning, within the height available in a motorhome, the weight should be concentrated as low as possible. For this reason, heavy items, such as generators, storage and holding tanks for water and fuel, and the engine are optimally placed low in the chassis.

Since motorhomes are mobile structures, they are typically exposed to the stresses of driving over roads that are in places quite rough. In addition, an motorhome will often have to travel over some distance of dirt surface to reach a camping space. Since an motorhome is typically used outdoors, it is exposed to the stresses of inclement weather and high winds. It can be appreciated that structural integrity is highly desired in an motorhome. However, the weight and size limitations previously mentioned place a limit on the strength of an motorhome. Accordingly, motorhomes are constructed to be as strong, but as light as possible.

The chassis of a motorhome is typically constructed on a steel ladder frame chassis. The chassis is a partially complete vehicle and is generally procured from a manufacturer such as or FORD MOTOR COMPANY. The chassis typically consists of two parallel frame rails extending the length of the chassis and interconnected with several perpendicular cross-braces to form a ladder frame. An engine, transmission, and fuel tank(s) are generally placed between the frame rails near one end. Suspension, steering, brake, and road wheel assemblies are attached outboard of the frame rails.

The coach bodywork, which provides and encloses the living space of the motorhome, is typically made from a laminate that can include light gauge sheet metal, plywood, vinyl, and insulation. The laminate is built to be strong, lightweight, weather resistant, and durable. The coach bodywork may also include a supporting framework. The floor of the coach typically rests indirectly on the chassis frame and the vertical walls extend upwards from the floor. The roof of the coach rests on and depends on the vertical walls of the body for structural support.

A completed motorhome may be up to 45' long and 13'6" high in most states. The chassis is generally on the order of 1' high and is elevated some distance above the ground by the suspension and wheels to provide ground clearance for suspension movement and clearing obstacles in the road. The interior flooring in current art motorhomes is typically elevated a significant amount above the upper face of the chassis in order to facilitate installing ancillary equipment. In addition, many prior art motorhomes route cooling or heating air ducts adjacent the roof structure or mount air-conditioning units on the roof. Under the overall height limit previously mentioned, these structures in or on the roof intrude into the available interior height envelope and limit the usable interior vertical space.

It is sometimes the practice in the art to place major components of an HVAC system, particularly air-conditioning (A/C) condensers and compressors, on the roof of the motorhome. Placement of these A/C components on the roof does not take up limited and valuable interior space inside the coach. Placement of these A/C components on the roof also exposes the condenser to fresh air which increases the efficiency of the heat transfer performed by the A/C system.

Placement of A/C systems and/or associated ducting in the roof does however create a difficulty with water condensation. As air conditioning units cool air to a temperature below the ambient temperature, it is understood that in many conditions the temperature of the air conditioning unit and ducting carrying the cooled air will be below the ambient dew point and thus liquid water will condense on the cool surfaces. If these cool surfaces are located above living areas of the motorhome, as is the case with many current designs, the liquid water can be readily drawn by gravity into the interior of the motorhome. It will be appreciated that liquid water intruding into the interior of the motorhome is an annoyance at best and can damage the structural integrity of interior structures as well as staining or warping interior finishings. Liquid water can also irreparably damage electronic equipment, such as laptop computers, televisions, and VCRs, such as would often be located in the interior of a motorhome. Therefore the condensed water is typically routed to run off the exterior surface of the RV. However this external draining tends to leave unsightly stains and can drip on persons underneath.

In an A/C system the evaporator is that portion of the system that absorbs heat from the ambient air thereby cooling the air and providing the air-conditioning effect. The evaporator portion of A/C system is thus preferably placed in proximity to the space to be air conditioned and the condenser and compressor portions can be readily placed elsewhere and joined to the evaporator by fluid lines. A heater or furnace in contrast does not typically comprise separate components that can be readily separated. Thus, the heater or furnace portion of a typical HVAC system is a unitized assembly, separate from the A/C system that is preferably also placed in the space to be heated, i.e. the interior of the motorhome coach. Disadvantageously, the combustion of fuels such as propane to heat air and the operation of fans to drive heated air into the interior of the coach tends to be noisy. Thus, placement of the furnace inside the coach, while better for heating efficiency, creates an annoyance for the occupants due to the noise of operation.

A further drawback to conventional HVAC systems known for motorhomes is that they have separate A/C and heating units with separate air ducting and filtering systems. Air is routed through the air conditioning unit through ducting and filtering members that are completely separate from the heating unit's ducting and filtering members. This ducting duplication results in additional separate heating and air-conditioning air filters that require periodic changing as well as additional interior space consumed by the ducting. As previously mentioned, interior space within the coach is highly valuable and preferably maximized for the occupants comfort and utility.

From the foregoing, it can be appreciated that there is a continuing need for a stronger motorhome coach construction that also provides increased interior living space. The structure should minimize weight to the motorhome and should also maintain as low a center of gravity as possible to benefit vehicle handling characteristics. There is also a need for a HVAC system that positions noisy components outside the interior of the coach and minimizes redundancies in ducting and filters to reduce costs and increase interior space and serviceability. The HVAC system preferably positions the A/C condenser and ducting in such a way that water that condenses out during use does not intrude into the interior of the motorhome.

SUMMARY OF THE INVENTION

The aforementioned needs are satisfied by the present invention, which in one aspect is as stated, the heating component is positioned outside of the interior of the motorhome. It is understood that the heating component will make noise during operation, and that noise could potentially annoy occupants of the motorhome. By positioning the heating component on the outside of the motorhome, sound must travel through the coach body in order to reach the interior of the motorhome and any occupants therein. However, the coach body will have natural sound dampening characteristics, and additional sound insulation might be included inside the walls of the coach body, both of which will substantially dampen noise generated by the heating component. Therefore, positioning the heating component as such will significantly reduce the amount of heating component noise reaching the interior of the motorhome. These and other objects and advantages of the present invention will become more fully apparent from the following description taken in conjunction with the accompanying drawings.

DETAILED DESCRIPTION OF THE PREFERRED EMBODIMENT

Figure 1:
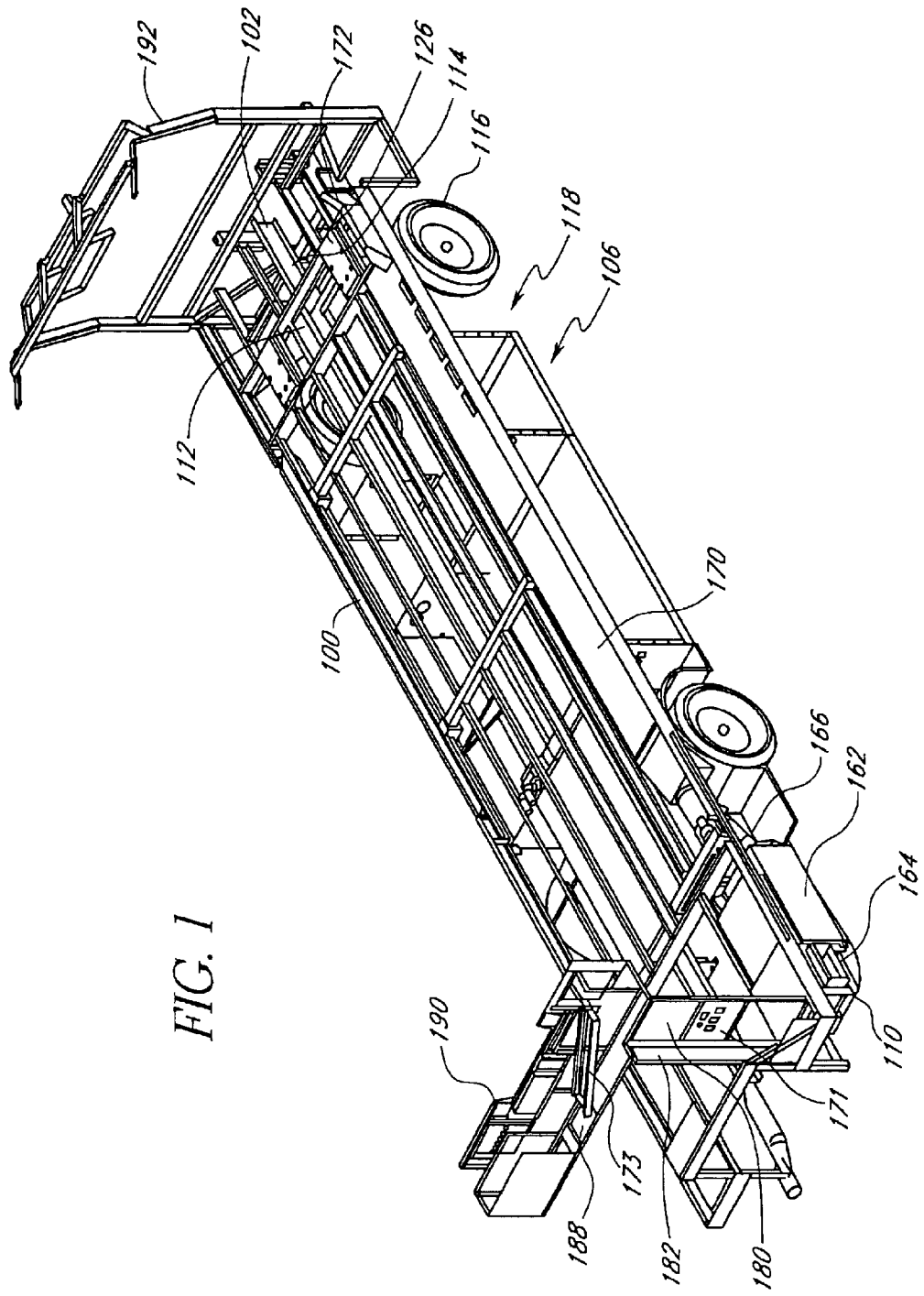
FIG. 1 is a perspective view of a preassembled vehicle frame mounted on a preassembled chassis forming the framework for a motorhome with a high interior ceiling including an HVAC system with common air return.
Figure 2:
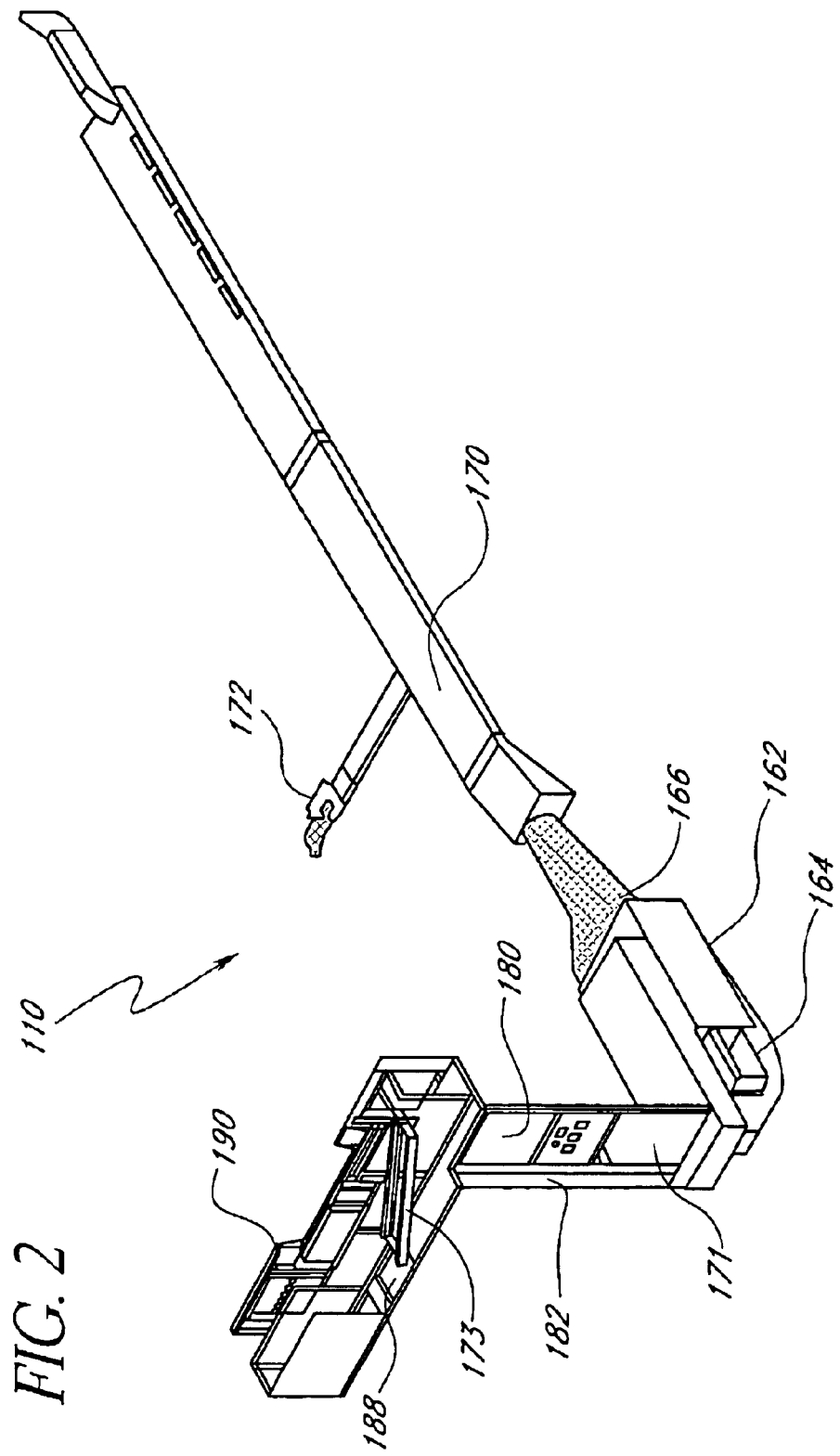
FIG. 2 is a perspective view of an assembled heating, ventilation, and air-conditioning (HVAC) system.

Reference will now be made to the drawings wherein like numerals refer to like parts throughout. FIG. 1 shows an preassembled vehicle frame 100 mounted to a preassembled chassis 102. The vehicle frame 100, mounted to the chassis 102 in the manner that will be described in greater detail below, facilitates the construction of a motorhome 104 (FIG. 3) with a greater interior ceiling height, which in this embodiment, is at least 7'-6" in a reduced time span. The vehicle frame 100 also facilitates mounting of relatively massive items, such as generators, furnaces, storage and holding tanks, and the like low to the ground so as to provide a lower center of mass for the motorhome 104.

The vehicle frame 100 provides a strong three dimensional space frame 118 to inhibit twisting of the vehicle frame 100 under torsional forces such as would arise when the motorhome 104 drives over uneven terrain so as to lift or drop a wheel 116 with respect to the other wheels 116. The vehicle frame 100 further defines integral storage areas 106 as part of the structure of the vehicle frame 100 in a manner that will be described in greater detail below. As shown in FIG. 1, the storage areas 106 are positioned below the beltline of the frame 100 and chassis 102. Placement of the storage areas 106 low within the motorhome 104 also positions items that may be stored in the storage areas 106 low within the motorhome 104. This aspect of the invention advantageously positions heavy cargo that users may place in the motorhome 104 low along the vertical extent of the motorhome 104 thereby maintaining an advantageously low center of mass.

The vehicle frame 100 further facilitates routing of a heating, ventilation, and air conditioning (HVAC) system 110 below the beltline of the frame 100 so as to avoid intrusion of the HVAC system 110 into the interior living space of the motorhome 104 to further enable increased interior ceiling height of the motorhome 104 employing the vehicle frame 100. The HVAC system 110 comprises a furnace 164 and air conditioning unit 162 including evaporator, condenser, and compressor. These relatively heavy portions of the HVAC system 110 are installed below the beltline of the frame 100 thereby maintaining a lower center of gravity (c.g.) than other designs.

The chassis 102 also comprises a plurality of road wheels 116 with corresponding suspension, brake systems, steering, and drive mechanisms of types known in the art that are positioned at substantially the front and rear corners of the chassis 102 in the manner illustrated in FIG. 1. The road wheels 116 enable the motorhome 104 to roll along the road and to be steered and braked in a well understood manner. The road wheels 116 are positioned adjacent the overlapping raised rails 112 and lower rails 114. The chassis 102 further comprises an engine assembly, transmission, drive axle, fuel system, and electrical system (not illustrated) of types known in the art to provide the motive power for the motorhome 104. These items are advantageously located substantially within the plane of the rails 112 to lower the center of mass of the chassis 102 and thus the motorhome 104.

The chassis 102 of this embodiment is highly resistant to bending along longitudinal and transverse axes. However, the chassis 102, by itself, is susceptible to twisting along the plane of the longitudinal and transverse axes due to torsional forces. Such torsional force may arise when a road wheel(s) 116 at one corner of the chassis 102 is displaced either above or below the plane of the remaining road wheels 116. Additionally, the torque of the engine exerts a torsional force on the chassis 102.

The motorhome 104 of this embodiment is assembled on and around the interconnected vehicle frame 100 and the chassis 102. The motorhome 104 provides users with a vehicle having a variety of living spaces and amenities fitted within the motorhome 104. It is expected that the partitioning of the interior living spaces and placement of interior amenities will vary depending on the needs of any particular application or customer.

The motorhome 104 also comprises a front loop 192 as shown in FIG. 1. The loop 192 is a generally rectangular structure attached at the front of the motorhome 104 to the frame 100. The loop 192 provides structural support for interior body assemblies in the driver's and front passenger's area as well as the front exterior bodywork of the motorhome 104 and the front windshield. The loop 192 is assembled from a plurality of elongate steel members via welding in a similar manner to that previously described with respect to the frame 100.

The vehicle frame 100 also comprises seat supports 126. The seat supports 126 are, in one embodiment, rectangular structures formed from sheet steel approximately ⅛" thick and are approximately 12¹³⁄₁₆" by 22½". The seat supports 126 are fixedly attached to the vehicle frame 100 via a plurality of bolts and/or welding in a known manner adjacent the front end of the vehicle frame 100. The seat supports 126 provide a support and attachment structure for passenger seats 128 of known types. The passenger seats 128 provide seating accommodations for driver and passengers in a known manner.

The HVAC system 110 in this embodiment comprises the air conditioning unit 162, the furnace 164, a manifold 166, a duct 170, at least one register 172, an intake 171, and a filter 173 as illustrated in FIG. 1. The single (common) intake 171 (shown in section view in FIGS. 1 and 3) commonly directs air from the interior of the motorhome 104 to both the air conditioning unit 162 and the furnace 164. The filter 173 is positioned within the intake 171 and filters the air entering the HVAC system 110. The air conditioning unit 162 receives air from the interior of the motorhome 104 via the intake and cools this filtered incoming air and directs the cool air into the interior of the motorhome 104 via the manifold 166, duct 170 and register (s) 172. The furnace 164 warms incoming air and directs the warm air into the interior of the motorhome 104 also via the manifold 166, duct 170 and register(s) 172. The air-conditioning unit 162, furnace 164, and filter 173 are commercially available and the selection of an appropriate model of air-conditioning unit 162, furnace 164, and filter 173 is expected to vary depending on the size of and amount of insulation provided for a particular embodiment of motorhome 104.

Figure 3:
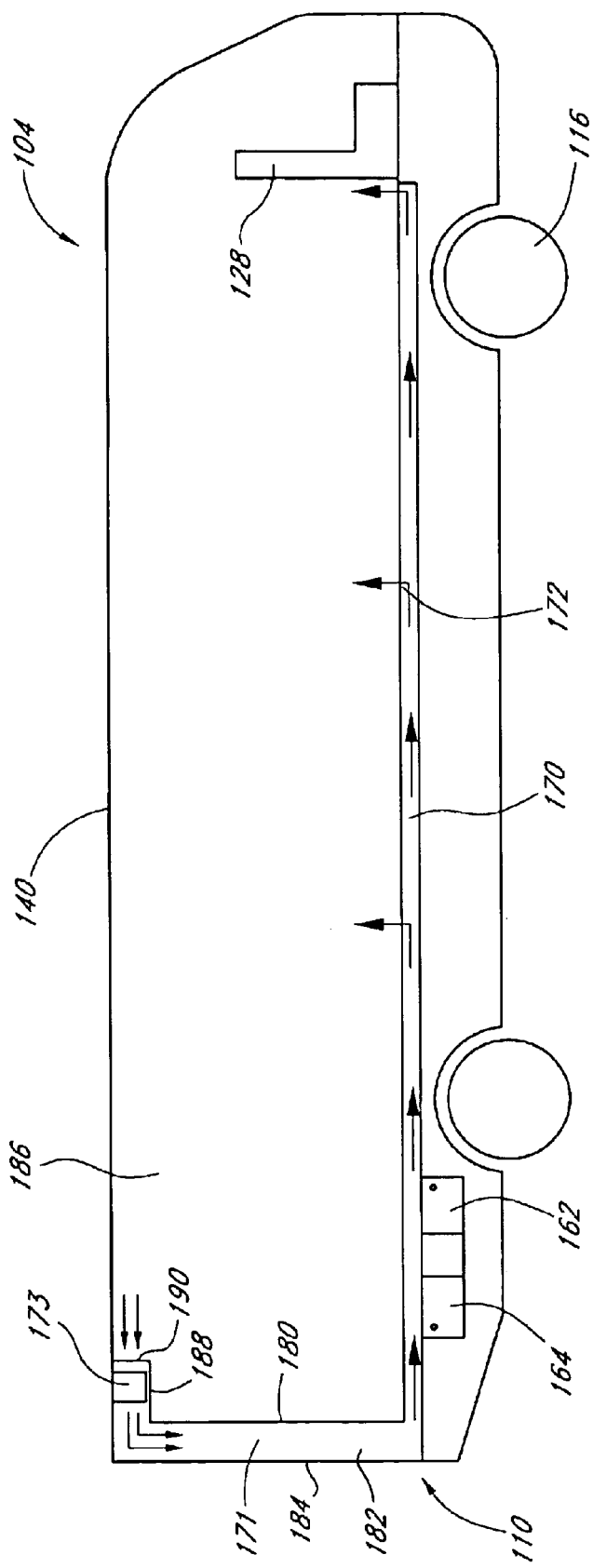
FIG. 3 is a side, section schematic view of a motorhome provided with the HVAC system of FIG. 2.

The manifold 166 receives air from both the air conditioning unit 162 and the furnace 164 and routes the air to the duct 170. The duct 170 extends substantially the length of the interior of the motorhome 104 as shown in FIGS. 1 and 3. The duct 170 carries the warm or cool air to at least one register 172. The registers 172 direct cool or warm air, received from the duct 170, into the interior of the motorhome 104. The registers 172 includes a screen to inhibit objects falling into the interior of the registers 172 and the duct 170.

The common intake 171 is advantageously formed on two sides by adjoining first 180 and second 182 interior trim panels extending generally vertically that serve both to direct the air inside the intake 171 and also provide interior trim in the interior of the motorhome 104. The other two sides of the intake 171 are formed by adjoining interior surfaces of the rear coach panel 184 and a side coach or structural panel 186 in a corner of the motorhome 104. In one embodiment, the common intake 171 further comprises adjoining third 188 and fourth 190 trim panels which adjoin the rear coach panel 184 and a coach roof structural panel 140 respectively so as to define a generally horizontally extending box structure. Thus, the intake 171 is substantially defined by body structures 184, 186, and 140 of the motorhome 104 that simultaneously serve other structural or aesthetic functions thereby reducing material redundancy and effecting weight and material savings for the motorhome 104. In addition, by directing air to both the air-conditioning unit 162 and the furnace 164, the common intake 171 of this embodiment, obviates the need for the separate air intakes for the A/C unit and the furnace of other know designs.

The common intake 171 of this embodiment also facilitates the use of a single filter 173 for the HVAC system 110. This single filter 173 reduces the time and expense of maintaining the HVAC system 110 by the end user as compared to other designs with multiple filters for the separate A/C and furnace systems. This commonality also reduces the time and expense of construction of the HVAC system 110 as well as reducing the weight thereof. In certain embodiments, the filter 173 can comprise a plurality of filter elements or stages, for example, a first filter element/stage adapted to remove larger air borne particles and a second filter element/stage adapted to remove smaller airborne particles that may pass through the first element/stage.

The HVAC system 110, of this embodiment, is located within or below the plane of the chassis 102. Positioning the air conditioning unit 162 and the furnace 164, which are both relatively heavy items, within or below the plane of the chassis 102 further lowers the center of gravity of the motorhome 104 to thereby improve the road handling of the motorhome 104. The placement of the HVAC system 110 of this embodiment also distances the duct 170 and registers 172 from the coach roof 140. Other known motorhome designs rout HVAC ducting adjacent the roof of the vehicle which exposes the cool air to thermal heating from sunlight incident on the roof of the vehicle. In the motorhome 104 of this embodiment, the duct 170, register 172, and air conditioning unit 162 are shaded from incident sunlight by the motorhome 104. Thus, the HVAC system 110 can more efficiently provide cool air to the interior of the motorhome 104. This improves the occupant's comfort in hot weather and reduces fuel costs for powering the HVAC system 110.

A further advantage of the HVAC system 110 of this embodiment is that the air conditioning unit 162, duct 170, and register 172 which carry cool air are located below the living space of the motorhome 104. As is well understood by those of ordinary skill in the art, a cooler than ambient surface, such as the air conditioning unit 162, duct 170, and register 172 induces liquid water to condense out of the atmosphere if the temperature of the surface is at or below the dew point. When air conditioning ducting is routed above the living space of a motorhome, liquid water that condenses on the ducting is drawn downwards by gravity. This can induce liquid water to intrude into walls, ceilings, and other interior materials. It can be appreciated that liquid water can readily damage the structural integrity of typical motorhome building materials. Liquid water can also stain and warp interior materials, damaging the aesthetics of a motorhome. The air conditioning unit 162, duct 170, and registers 172 of this embodiment are positioned below the living space of the motorhome 104 and thus water that condenses out during use of the HVAC system 110 is drawn downwards and away from the motorhome 104 without intruding into the living spaces of the motorhome 104.

An additional advantage of the HVAC system 110 of this embodiment is that placement of the HVAC system 110 adjacent and below the beltline of the chassis 102 obviates the need to place portions of an HVAC system on the roof of the motorhome 104. Other known HVAC systems place portions of the system on the exterior roof of a motorhome. This requires that the major plane of the outer roof be lowered with respect to the roof of the present invention so as to maintain the overall height restrictions previously mentioned. Lowering the exterior roof height results in corresponding lowering of the interior ceiling height and a corresponding reduction in the interior space and livability of such a motorhome.

Yet another advantage of the HVAC system 110 of this embodiment is that placement of the HVAC system 110 adjacent and below the beltline of the chassis 102 distances the furnace 164 and air conditioning unit 162 from the interior of the motorhome 104. The air conditioning unit 162 and furnace 164 are relatively noisy in operation. Placing the HVAC system 110 outside the interior of the motorhome 104 distances the noise sources of the air conditioning unit 162 and the furnace 164 and thus provides a quieter, more comfortable living environment for users of the motorhome 104.

Although the preferred embodiments of the present invention have shown, described and pointed out the fundamental novel features of the invention as applied to those embodiments, it will be understood that various omissions, substitutions and changes in the form of the detail of the device illustrated may be made by those skilled in the art without departing from the spirit of the present invention. Consequently, the scope of the invention should not be limited to the foregoing description but is to be defined by the appended claims.

What is claimed is:

1. A heating, ventilation, and air-conditioning (HVAC) system for a motorhome having an interior living area enclosed by interconnected side coach panels and a rear coach panel, the HVAC system comprising:
 a furnace unit;
 an air-conditioning unit wherein the furnace and the air-conditioning units are positioned below the interior living area of the motorhome;
 first and second adjoining interior trim panels; and
 a common air intake directing air from the interior living area to both the furnace and the air-conditioning units wherein the common air intake comprises four adjoining inner surfaces of the rear coach panel, one of the side coach panels, and two inner surfaces of the first and second adjoining interior trim panels wherein each of the one side and rear panels adjoins one of the two adjoining interior trim panels so as to together define a box structure.

2. The HVAC system of claim 1, further comprising a filter positioned within the common air intake.

3. The HVAC system of claim 1, further comprising a single outlet duct and at least one register in communication with the outlet duct directing air from the HVAC system into the interior living area of the motorhome.

4. The HVAC system of claim 1, wherein the common air intake further comprises inner surfaces of third and fourth adjoining trim panels and an inner surface of a roof coach panel.

5. The HVAC system of claim 4, wherein the first and second trim panels extend generally vertically and the third and fourth trim panels extend generally horizontally.

6. A motorhome having a rear and two side structural panels and at least first and second interior trim panels together defining an interior of the motorhome, the motorhome comprising:

a frame defining a floor plane;

a heating, ventilation, and air-conditioning (HVAC) system having a distributed weight wherein the majority of the weight of the HVAC system is positioned below the floor plane; and a common air intake directing air from the interior of the motorhome to the HVAC system wherein the common air intake comprises interior surfaces of the rear and one of the two side structural panels, and the first and second interior trim panels.

7. The motorhome of claim 6, further comprising a common outlet duct and at least one register directing air from the HVAC system to the interior of the motorhome.

8. The motorhome of claim 6, further comprising a single filter assembly positioned within the common air intake.

9. The motorhome of claim 6, wherein the HVAC system comprises a furnace and air-conditioning unit wherein the furnace and air-conditioning unit are positioned below the floor plane.

10. The motorhome of claim 6, wherein the motorhome comprises third and fourth adjoining interior trim panels and a roof structural panel and the common air intake further comprises inner surfaces of the third and fourth adjoining interior trim panels and an inner surface of the roof structural panel.

11. The motorhome of claim 10, wherein the first and second interior trim panels extend generally vertically and the third and fourth interior trim panels extend generally horizontally.

12. The motorhome of claim 10, further comprising a filter wherein the filter is retained by at least one of the first, second, third, and fourth interior trim panels.

* * * * *